US010807815B2

(12) United States Patent
Tateishi (10) Patent No.: US 10,807,815 B2
(45) Date of Patent: Oct. 20, 2020

(54) SHEET FEEDING APPARATUS AND IMAGE FORMING APPARATUS

(71) Applicant: CANON KABUSHIKI KAISHA, Tokyo (JP)

(72) Inventor: Tomoya Tateishi, Kamakura (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/964,146

(22) Filed: Apr. 27, 2018

(65) Prior Publication Data

US 2018/0329351 A1  Nov. 15, 2018

(30) Foreign Application Priority Data

May 10, 2017  (JP) .................. 2017-093500

(51) Int. Cl.
*B65H 1/26* (2006.01)
*B65H 1/04* (2006.01)
(Continued)

(52) U.S. Cl.
CPC .............. *B65H 1/04* (2013.01); *B65H 1/266* (2013.01); *B65H 3/0653* (2013.01); *B65H 7/02* (2013.01); *G03G 15/607* (2013.01); *G03G 15/6511* (2013.01); *H04N 1/00602* (2013.01); *B65H 2405/113* (2013.01); *B65H 2511/10* (2013.01);
(Continued)

(58) Field of Classification Search
CPC ........ B65H 1/04; B65H 1/266; B65H 3/0653; B65H 7/02; B65H 2405/113; B65H 2553/612
See application file for complete search history.

(56) References Cited

U.S. PATENT DOCUMENTS 7,753,360 B2   7/2010  Takeuchi et al.
7,971,868 B2   7/2011  Matsushima et al.
(Continued)

FOREIGN PATENT DOCUMENTS

CN   101381036 A   3/2009
CN   102442558 A   5/2012
(Continued)

OTHER PUBLICATIONS

English translation of JP 6-37237 (Year: 1994).*
(Continued)

*Primary Examiner* — Howard J Sanders
(74) *Attorney, Agent, or Firm* — Venable LLP (57) ABSTRACT

A sheet feeding apparatus includes a stacking portion having a stacking surface on which sheets are stacked, a feeding portion configured to feed the sheets stacked on the stacking surface, and an abutment member having a contact surface configured to contact edges of the sheets stacked on the stacking surface and extending along a stacking direction of the sheets. The abutment member moves with a constant contact angle between the contact surface and the edges of the sheets in a cross section parallel with the stacking direction in a case where the contact surface is pushed by the sheets inserted toward the feeding portion in an insertion direction. In addition, a detection portion is configured to output a detection signal in accordance with a position of the abutment member.

15 Claims, 10 Drawing Sheets

(51) Int. Cl.
  *B65H 7/02* (2006.01)
  *B65H 3/06* (2006.01)
  *G03G 15/00* (2006.01)
  *H04N 1/00* (2006.01)
(52) U.S. Cl.
  CPC .... *B65H 2511/51* (2013.01); *B65H 2511/515* (2013.01); *B65H 2553/612* (2013.01)

(56) References Cited

U.S. PATENT DOCUMENTS

| | | | |
|---|---|---|---|
| 8,317,189 | B2 | 11/2012 | Ueda et al. |
| 8,448,940 | B2 | 5/2013 | Ueda et al. |
| 9,444,960 | B2 | 9/2016 | Maeda et al. |
| 9,637,329 | B2 | 5/2017 | Hayayumi |
| 2002/0136575 | A1 | 9/2002 | Cornelius |
| 2007/0069450 | A1* | 3/2007 | Kawanishi ............. B65H 1/266 271/162 |
| 2015/0329300 | A1 | 11/2015 | Hayayumi |
| 2016/0289017 | A1* | 10/2016 | Yoshida .................. B65H 1/04 |

FOREIGN PATENT DOCUMENTS

| | | |
|---|---|---|
| CN | 105600532 A | 5/2016 |
| JP | S59-192053 U | 12/1984 |
| JP | H04-243732 A | 8/1992 |
| JP | 6-37237 U | 5/1994 |
| JP | 2003-002455 A | 1/2003 |
| JP | 2006-264808 A | 10/2006 |
| JP | 2007-295266 A | 11/2007 |
| JP | 2009-132481 A | 6/2009 |
| JP | 2014-009082 A | 1/2014 |
| JP | 2015-218019 A | 12/2015 |
| JP | 2016-094284 A | 5/2016 |
| JP | 2016-124626 A | 7/2016 |

OTHER PUBLICATIONS

European Search Report dated Oct. 15, 2018, in related European Patent Application No. 18167533.1.
Japanese Office Action dated Jul. 9, 2019, in related Japanese Patent Application No. 2017-093500.
Japanese Office Action dated Mar. 12, 2019, in related Japanese Patent Application No. 2017-093500.
Chinese Office Action dated Jan. 2, 2020, in related Chinese Patent Application No. 201810439993.0 (with English translation).
Korean Office Action dated Jul. 20, 2020, in related Korean Patent Application No. 10-2018-0048849.

* cited by examiner

SHEET FEEDING APPARATUS AND IMAGE FORMING APPARATUS

BACKGROUND OF THE INVENTION

Field of the Invention

The present invention relates to a sheet feeding apparatus for feeding sheets and an image forming apparatus including the sheet feeding apparatus.

Description of the Related Art

In general, image forming apparatuses, such as printers, have a sheet detection sensor which detects sheets stored in a cassette. A known sheet detection sensor includes a flag member and an optical sensor. The flag member contacts a top surface of sheets stored in a cassette, and thereby pivots. The optical sensor changes a signal when the flag member blocks an optical path.

Japanese Patent Application Publication No. 2016-94284 proposes a paper detection apparatus having a sensor arm. The sensor arm rotates toward a vertical direction around a rotation shaft extending in a horizontal direction, when the sensor arm contacts leading edges of sheets. That is, the sensor arm rotates upward when a cassette which stores sheets is attached to an apparatus body, and thereby the leading edges of the sheets push the sensor arm. With this operation, an optical switch is turned ON.

However, since the sensor arm described in Japanese Patent Application Publication No. 2016-94284 rotates toward the vertical direction around the rotation shaft extending in the horizontal direction, the height of the sensor arm in the vertical direction changes while the cassette is attached to the apparatus body. As a result, the contact angle between the sensor arm and the sheets, in a vertical plane, also changes. With this change, the force of the sheets which pushes the sensor arm also changes. In particular, if low-stiffness sheets are used, the sheets may not be able to push the sensor arm and may be bent.

SUMMARY OF THE INVENTION

According to one aspect of the present invention, a sheet feeding apparatus includes a stacking portion comprising a stacking surface on which sheets are stacked, a feeding portion configured to feed the sheets stacked on the stacking surface, an abutment member comprising a contact surface configured to contact edges of the sheets stacked on the stacking surface and extending along a stacking direction of the sheets, the abutment member being configured to move with a constant contact angle between the contact surface and the edges of the sheets in a cross section parallel with the stacking direction in a case where the contact surface is pushed by the sheets stacked on the stacking surface, and a detection portion configured to output a detection signal in accordance with a position of the abutment member.

Further features of the present invention will become apparent from the following description of exemplary embodiments with reference to the attached drawings.

DESCRIPTION OF THE EMBODIMENTS

First Embodiment

Overall Configuration

Figure 1:
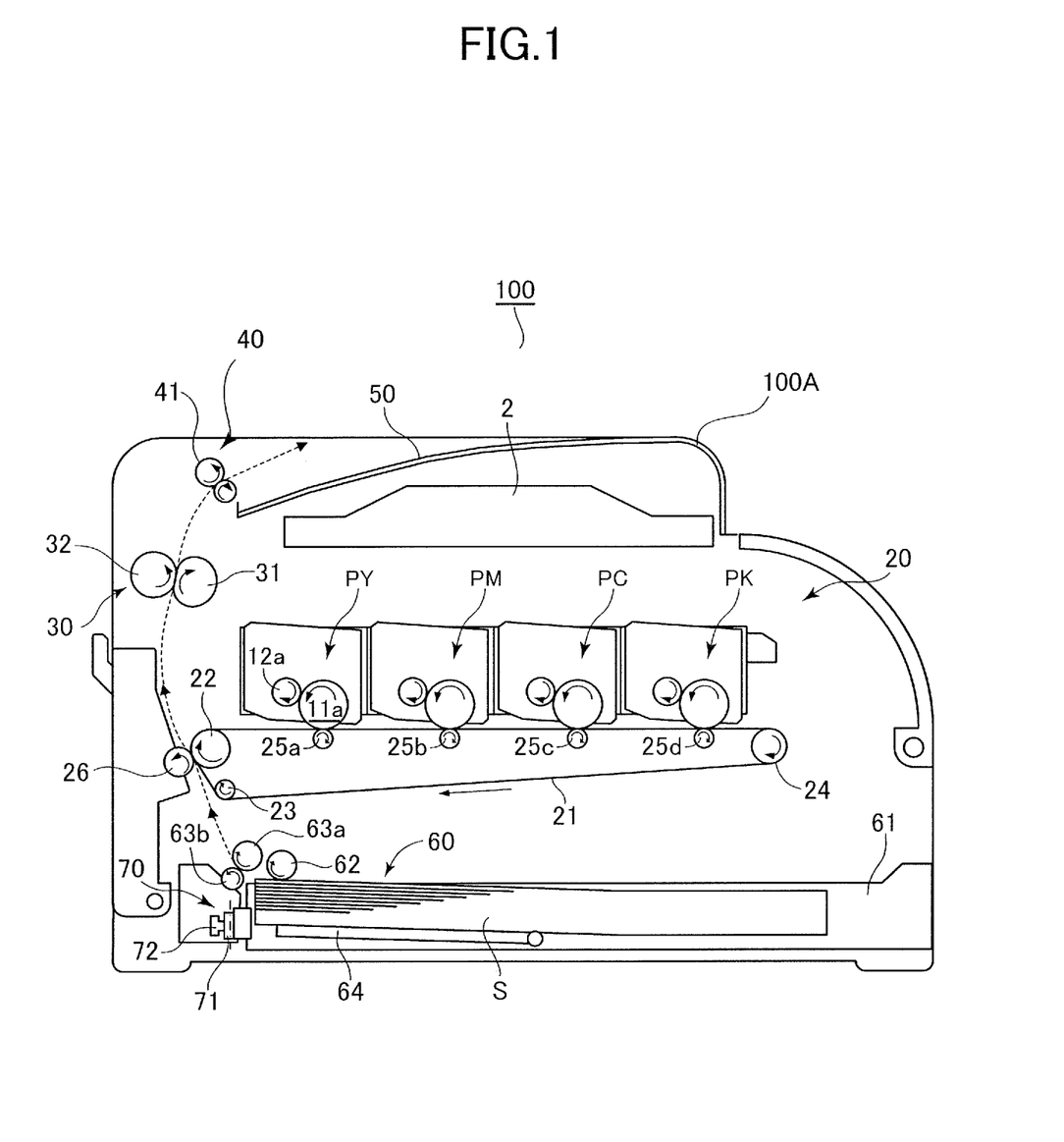
FIG. 1 is an overall schematic diagram of a printer of a first embodiment.

First, a first embodiment of the present invention will be described. A printer 100, which serves as an image forming apparatus, is an electrophotographic laser beam printer. As illustrated in FIG. 1, the printer 100 includes an image forming portion 20 that forms images on sheets S, a sheet feeding apparatus 60, and a fixing apparatus 30. The image forming portion 20 includes four process-cartridges PY, PM, PC, and PK, and a scanner unit 2. The four process-cartridges PY, PM, PC, and PK are used to form four toner-images of yellow (Y), magenta (M), cyan (C), and black (K).

The four process-cartridges PY, PM, PC, and PK have the same configuration except that they form different color images. For this reason, the configuration and the image forming process of the process cartridge PY will be described as a representative example, and the description for the other process-cartridges PM, PC, and PK will be omitted.

The process cartridge PY includes a photosensitive drum 11a, a charging roller (not illustrated), and a developing roller 12a. The photosensitive drum 11a has a configuration in which an outer periphery of an aluminum cylinder is coated with organic photoconductive material, and is rotated by a driving motor (not illustrated). An intermediate transfer belt 21 is wound around and stretched by a driving roller 22, a driven roller 24, and a tension roller 23; and is rotated by the driving roller 22. Inside the intermediate transfer belt 21, primary transfer rollers 25a, 25b, 25c, and 25d are provided. The fixing apparatus 30 includes a fixing film 31 and a pressure roller 32. The fixing film 31 is heated by a heater which serves as a heating unit. The pressure roller 32 is in pressure contact with the fixing film 31. The sheet feeding apparatus 60 is disposed in a lower portion of the printer 100, and stores the sheets S.

Next, an image forming operation of the printer 100 configured in this manner will be described. When the scanner unit 2 receives an image signal from a device, such as a personal computer (not illustrated), the scanner unit 2 irradiates the photosensitive drum 11a of the process cartridge PY, with a laser beam corresponding to the image signal.

At this time, the surface of the photosensitive drum 11a has been electrically charged uniformly, by the charging roller, so as to have a predetermined polarity and electric potential. Thus, when the photosensitive drum 11a is irradiated with the laser beam by the scanner unit 2, an electrostatic latent image is formed on the surface of the photosensitive drum 11a. The electrostatic latent image, formed on the photosensitive drum 11a, is developed by the developing roller 12a, and then a toner image of yellow (Y) is formed on the photosensitive drum 11a.

Similarly, photosensitive drums of the process cartridges PM, PC, and PK are also irradiated with laser beams by the scanner unit 2, and then toner images of magenta (M), cyan (C), and black (K) are formed on the photosensitive drums. The toner images of the colors, formed on the photosensitive drums, are transferred onto the intermediate transfer belt 21 by the primary transfer rollers 25a, 25b, 25c, and 25d, and conveyed to a secondary transfer roller 26 by the intermediate transfer belt 21, which is rotated by the driving roller 22. Here, the image forming process of each color is performed so that a toner image of each color is superposed on a toner image which has been primary-transferred on the intermediate transfer belt 21 in an upstream process.

While the image forming process is performed, the sheets S stored in the sheet feeding apparatus 60 are sent to a pickup roller 62, which serves as a feeding portion, and then separated, one by one, and conveyed by a feed roller 63a and a separation roller 63b. Then, a full-color toner image formed on the intermediate transfer belt 21 is transferred onto each of the sheets S by a secondary transfer bias applied to a secondary transfer roller 26.

The sheet S onto which the toner image has been transferred is applied with predetermined heat and pressure by the fixing film 31 and the pressure roller 32 of the fixing apparatus 30. As a result, the toner is melted and solidified to adhere to the sheet S (that is, the toner is fixed to the sheet S). The sheet S which has passed through the fixing apparatus 30 is discharged onto a discharge tray 50 by a discharge roller pair 41 of a discharge portion 40. Arrows of FIG. 1 formed with a broken line indicate an example of a conveyance path extending from the sheet feeding apparatus 60 to the discharge roller pair 41. The sheet S is conveyed along the conveyance path.

Sheet Feeding Apparatus

Figure 2:
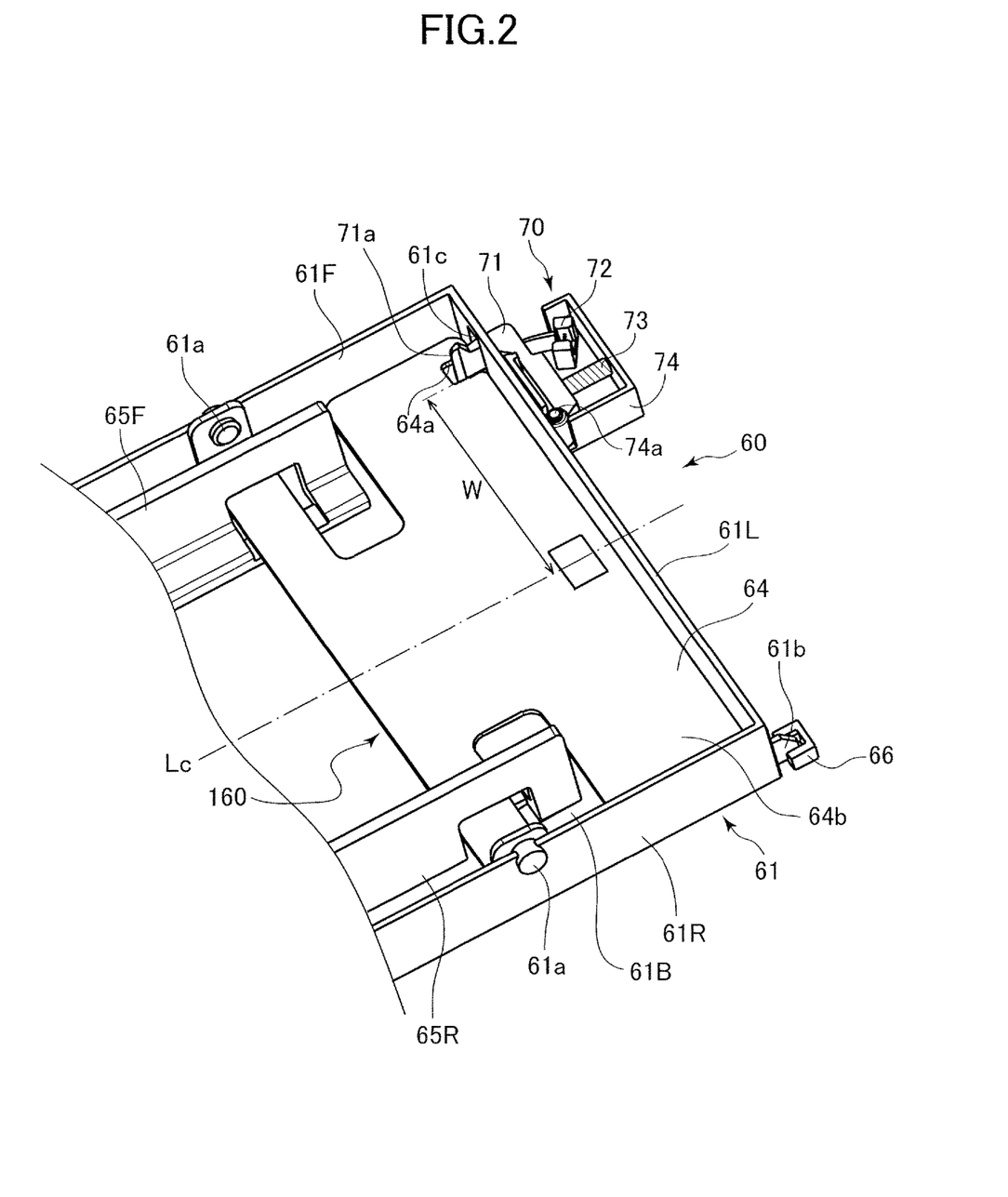
FIG. 2 is a perspective view illustrating a sheet feeding apparatus.

As illustrated in FIG. 2, the sheet feeding apparatus 60 includes a cassette 61 and a sheet supporting portion 64. The cassette 61 can be attached to and drawn from a cassette attachment portion, which is disposed in a lower portion of an apparatus body 100A (see FIG. 1). The sheet supporting portion 64 is supported by the cassette 61. The cassette 61, which serves as a supporting portion, and the sheet supporting portion 64, which serves as a moving portion, constitute a stacking portion 160. The cassette 61 is formed like a box whose upper portion is opened, and includes a base plate 61B, side plates 61F, 61R, and 61L, and a rear side plate (not illustrated). In the present embodiment, the description will be made using definitions in which a forward direction of the printer 100 corresponds to the rightward direction of FIG. 1, a backward direction of the printer 100 corresponds to the leftward direction of FIG. 1, the forward direction corresponds to a direction in which the process cartridge PK of the image forming portion 20 is arranged, and the backward direction corresponds to a direction in which the process cartridge PY is arranged. Thus, the cassette 61 is attached to the apparatus body 100A from the rightward direction toward the leftward direction of FIG. 1. In FIG. 2, the cassette 61 is to be attached to the apparatus body 100A (see FIG. 1) along a stack center line Lc in an attachment direction, with the side plate 61L disposed forward in the attachment direction.

Figure 3A:
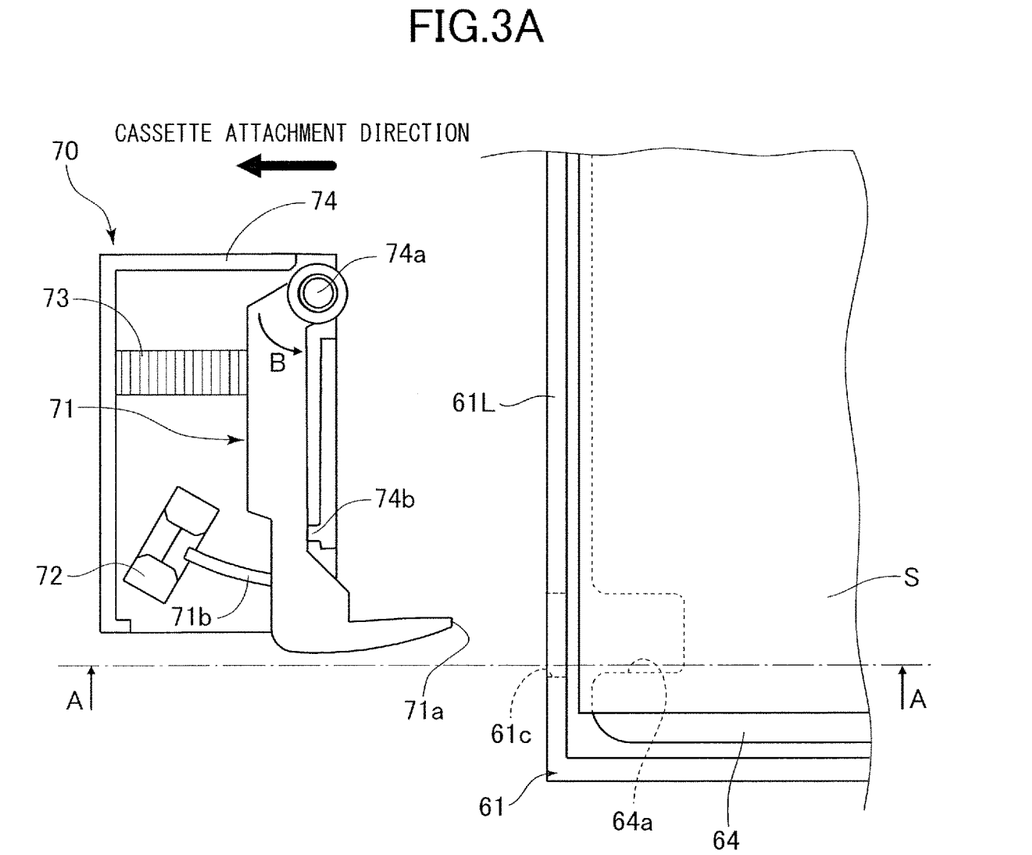
FIG. 3A is a plan view illustrating a sheet detection unit and a cassette.
Figure 3B:
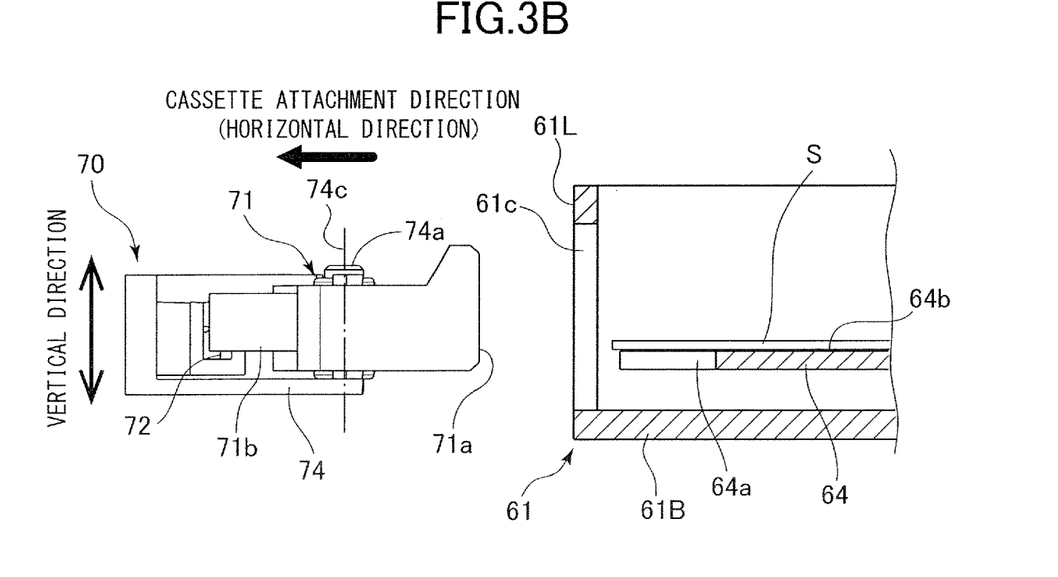
FIG. 3B is a cross-sectional view illustrating the sheet detection unit and the cassette.
Figure 6A:
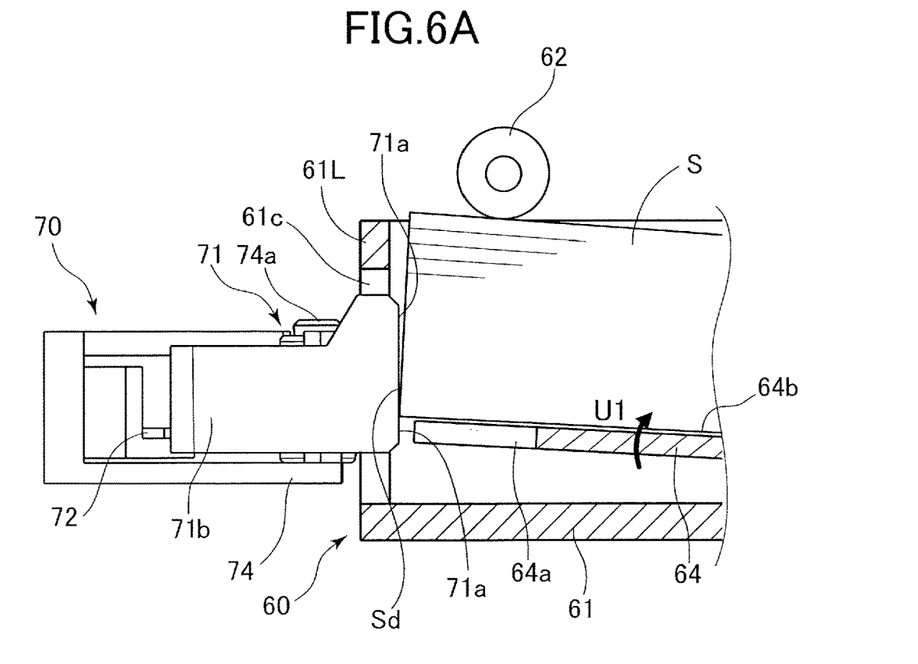
FIG. 6A is a cross-sectional view illustrating the sheet feeding apparatus in a state where sheets are fully stacked.
Figure 6B:
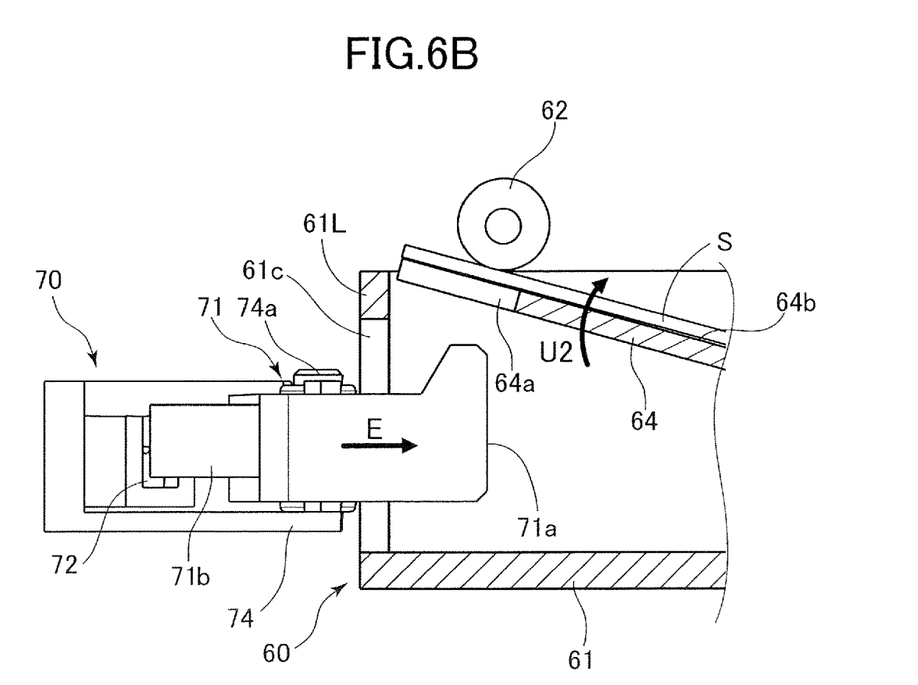
FIG. 6B is a cross-sectional view illustrating the sheet feeding apparatus in a state where sheets are slightly stacked.

The sheet supporting portion 64 is supported so that the sheet supporting portion 64 can pivot around supporting points 61a with respect to the side plates 61F and 61R of the cassette 61. A stacking surface 64b is a top surface of the sheet supporting portion 64, and the sheets S are stacked on the stacking surface 64b. The sheet supporting portion 64 can move between a first position at which the sheet supporting portion 64 is positioned when the sheets S are set, and a second position at which the sheet supporting portion 64 is positioned when the sheets S are fed. That is, the first position is a lower position at which the sheet supporting portion 64 is closer to the base plate 61B as illustrated in FIG. 3B, and the second position is a higher position at which the sheets S, stacked on the sheet supporting portion 64, can be fed by the pickup roller 62 as illustrated in FIG. 6B.

Figure 10:
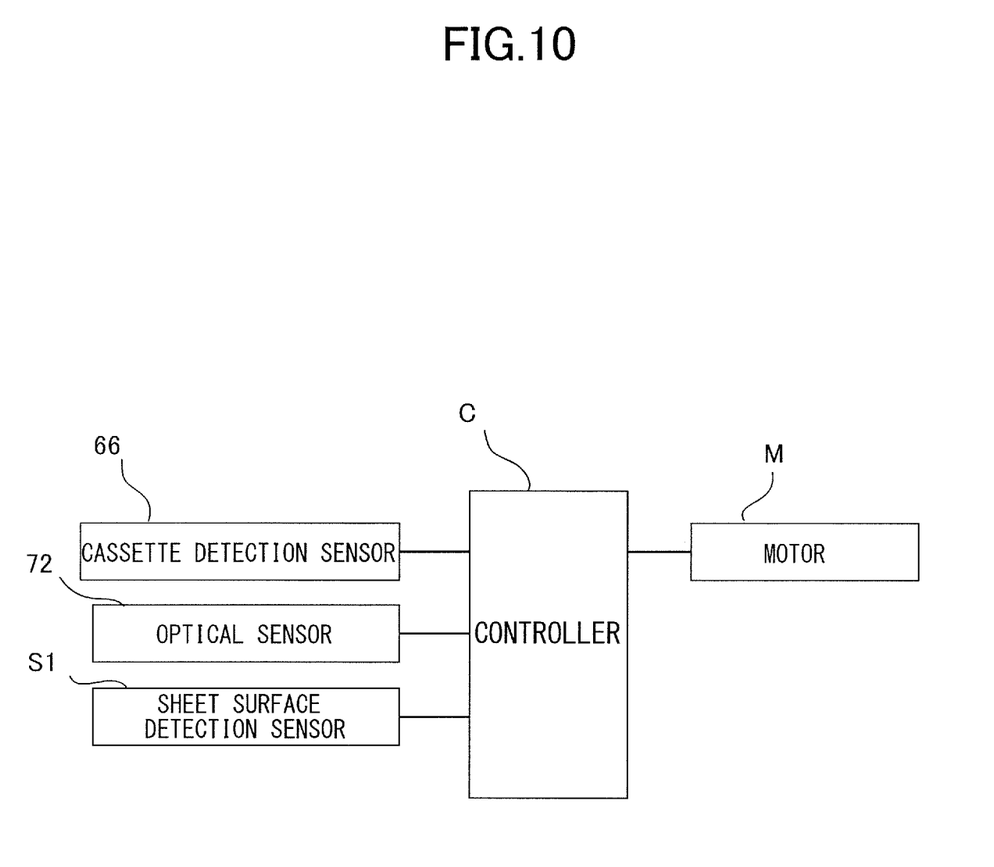
FIG. 10 is a control block diagram of a controller of the first embodiment.

A configuration and control method to raise the sheet supporting portion 64 from the first position to the second position will be described with reference to the control block diagram of FIG. 10. The sheet supporting portion 64 is pressed upward by a lifter plate (not illustrated), which is pivoted upward by a driving force of a motor M, which serves as a driving source. With this operation, the leading edge side (the right side in FIG. 2) of the sheet supporting portion 64 pivots upward on the supporting points 61a. The sheet feeding apparatus 60 includes a sheet surface detection sensor S1 which detects a top surface of the sheets, stacked on the stacking surface 64b. A controller C, which includes a CPU, a ROM, and a RAM, controls the motor M in accordance with a detection signal from the sheet surface detection sensor S1, and raises the sheet supporting portion 64 to the second position and stops it at the second position. Then the pickup roller 62 contacts the top surface of the sheets stacked on the sheet supporting portion 64, and rotates to feed the sheets. After one sheet is fed, the position of the top surface of the sheets becomes lower. Then the motor M is driven in accordance with a detection signal from the sheet surface detection sensor S1, and raises the sheet supporting portion 64.

The sheet supporting portion 64 may be directly pivoted by the supporting points 61a which are applied with a driving force by the motor M. Alternatively, the driving force may not be used, and the sheet supporting portion 64 may be urged upward by using a spring. In this configuration, before the cassette is attached to the apparatus body, the sheet supporting portion 64 may be locked by a lock mechanism at the first position, at which the sheets can be fed, against the urging force of the spring; when the cassette is attached to the apparatus body, the lock may be released so that the spring urges the sheet supporting portion 64 upward.

On the base plate 61B of the cassette 61, side regulation plates 65F and 65R are movably supported. The side regulation plates, 65F and 65R, have respective racks (not illustrated) extending in a width direction orthogonal to the conveyance direction for the sheets. The racks each engage with a corresponding pinion, so that the side regulation plates, 65F and 65R, can symmetrically move with each other in the width direction of the sheets, with respect to the stack center line Lc. That is, when the side regulation plate 65F moves in the width direction, the side regulation plate 65R also moves. In this manner, the side regulation plates, 65F and 65R, can regulate both edge portions, in the width direction, of the sheets stacked on the sheet supporting portion 64. Thus, the sheets are completely overlapped with each other, with the stack center line Lc serving as a reference. The stack center line Lc is aligned with a reference line along which the sheet is conveyed in the printer 100, that is, a line connecting center points of the sheet conveyance path, positioned in the width direction. The sheets are conveyed such that a center portion of each of the sheets in the width direction moves on the stack center line Lc and the reference line. In addition, on the base plate 61B of the cassette 61, a trailing edge regulation plate (not illustrated) is formed to regulate downstream edges of the sheets S in the cassette attachment direction. The trailing edge regulation plate is disposed so as to extend substantially perpendicular to the base plate 61B, and is supported so that the trailing edge regulation plate can move in the cassette attachment direction so as to adapt to the size of the sheets.

The side plate 61L of the cassette 61 is provided with a rib 61b, which protrudes toward the cassette attachment direction. In addition, the apparatus body 100A (see FIG. 1) is provided with a cassette detection sensor 66, which is an attachment detection portion including an optical sensor. When the cassette 61 is attached to the apparatus body 100A, the rib 61b blocks an optical path of the cassette detection sensor 66, and thus the cassette detection sensor 66 is turned ON. With this operation, the attachment of the cassette 61 can be detected. Here, the attachment of the cassette 61 to the apparatus body 100A is detected by the controller C illustrated in FIG. 10, in accordance with a detection signal produced when the optical path of the cassette detection sensor 66 is blocked (that is, light is blocked) by the rib 61b. In the present embodiment, when the controller C detects the attachment of the cassette 61 in accordance with the detection signal from the cassette detection sensor 66, the controller C raises the sheet supporting portion 64 from the first position to the second position by controlling the motor M. Thus, in a state where the cassette 61 is attached to the apparatus body 100A, the sheet supporting portion 64 is positioned at the second position. In addition, the cassette attachment portion of the apparatus body 100A is provided with the sheet detection unit 70 such that the sheet detection unit 70 faces the side plate 61L of the cassette 61.

Sheet Detection Unit

Next, the sheet detection unit 70 will be described in detail. As illustrated in FIGS. 2, 3A, and 3B, the sheet detection unit 70, which serves as a detection portion, includes a holder 74 fixed to the apparatus body 100A, a lever 71 serving as an abutment member, an optical sensor 72, and a pressing spring 73. The lever 71 is supported by the holder 74 so that the lever 71 can pivot around a pivot axis 74c of a pivot shaft 74a extending in the vertical direction. In addition, the lever 71 is urged by the pressing spring 73 toward a direction indicated by an arrow B. The lever 71, urged by the pressing spring 73, is positioned by a stopper 74b provided on the holder 74. The optical sensor 72 includes a light emitting portion and a light receiving portion (both not illustrated). The optical sensor 72 produces signals when an optical path between the light emitting portion and the light receiving portion is blocked (light is blocked), and when the optical path is unblocked. The signal produced when the optical path is blocked is different from the signal produced when the optical path is unblocked. At the leading end of the lever 71, there is provided a contact surface 71a to which the edges of the sheets contact. The contact surface 71a is formed so as to extend in the vertical direction. The extending direction of the contact surface 71a is substantially parallel with the pivot axis 74c of the pivot shaft 74a. That is, the pivot axis 74c extends along the extending direction of the contact surface 71a.

The direction in which the pivot axis 74c of the pivot shaft 74a of the lever 71 extends may be a direction which is perpendicular to the stacking surface 64b of the sheet supporting portion 64, or may be a direction which is perpendicular to a plane including the top surface of the base plate 61B of the cassette 61. In this case, the extending direction of the contact surface 71a may be substantially parallel with the pivot axis 74c of the pivot shaft 74a. With this arrangement, when the cassette 61 is attached to the apparatus body 100A, the contact surface 71a is parallel with downstream edges Sd, in the cassette attachment direction, of the sheets S stored in the cassette 61, and extends in the stacking direction of the sheets S. When the contact surface 71a is pushed by the downstream edges Sd of the sheets S in the process of the attachment of the cassette 61, the lever 71 pivots around the pivot axis 74c of the pivot shaft 74a. Thus, while the lever 71 pivots, a contact position between the contact surface 71a and the downstream edges Sd of the sheets S hardly changes in the vertical direction. That is, while the lever 71 is pushed and pivoted by the downstream edges Sd of the sheets S, a contact angle between the contact surface 71a and the downstream edges Sd of the sheets S hardly changes in a cross section (for example, see FIG. 4B) parallel to the stacking direction of the sheets.

The lever 71 has a flag portion 71b extending toward the apparatus body 100A. Thus, when the optical path is blocked (light is blocked) by the flag portion 71b, the optical sensor 72 is turned ON; when the optical path is unblocked, the optical sensor 72 is turned OFF. In this manner, since the optical sensor 72 changes its output detection signal in accordance with the position of the lever 71, the position of the lever 71 can be detected. In a state where the lever 71 is in contact with the stopper 74b, the optical path of the optical sensor 72 is not blocked by the flag portion 71b of the lever 71.

The side plate 61L of the cassette 61 is provided with a hole 61c, through which the contact surface 71a of the lever 71 can pass. Thus, when the cassette 61 is attached to the apparatus body 100A, the lever 71 passes through the hole 61c. In addition, the sheet supporting portion 64 is provided with a recessed portion 64a at a position corresponding to the contact surface 71a of the lever 71. Thus, when the cassette 61 is attached to the apparatus body 100A, the lever 71 enters the hole 61c and the recessed portion 64a, and the contact surface 71a of the lever 71 contacts the edges of the sheets, which are stacked on the sheet supporting portion 64.

Figure 5:
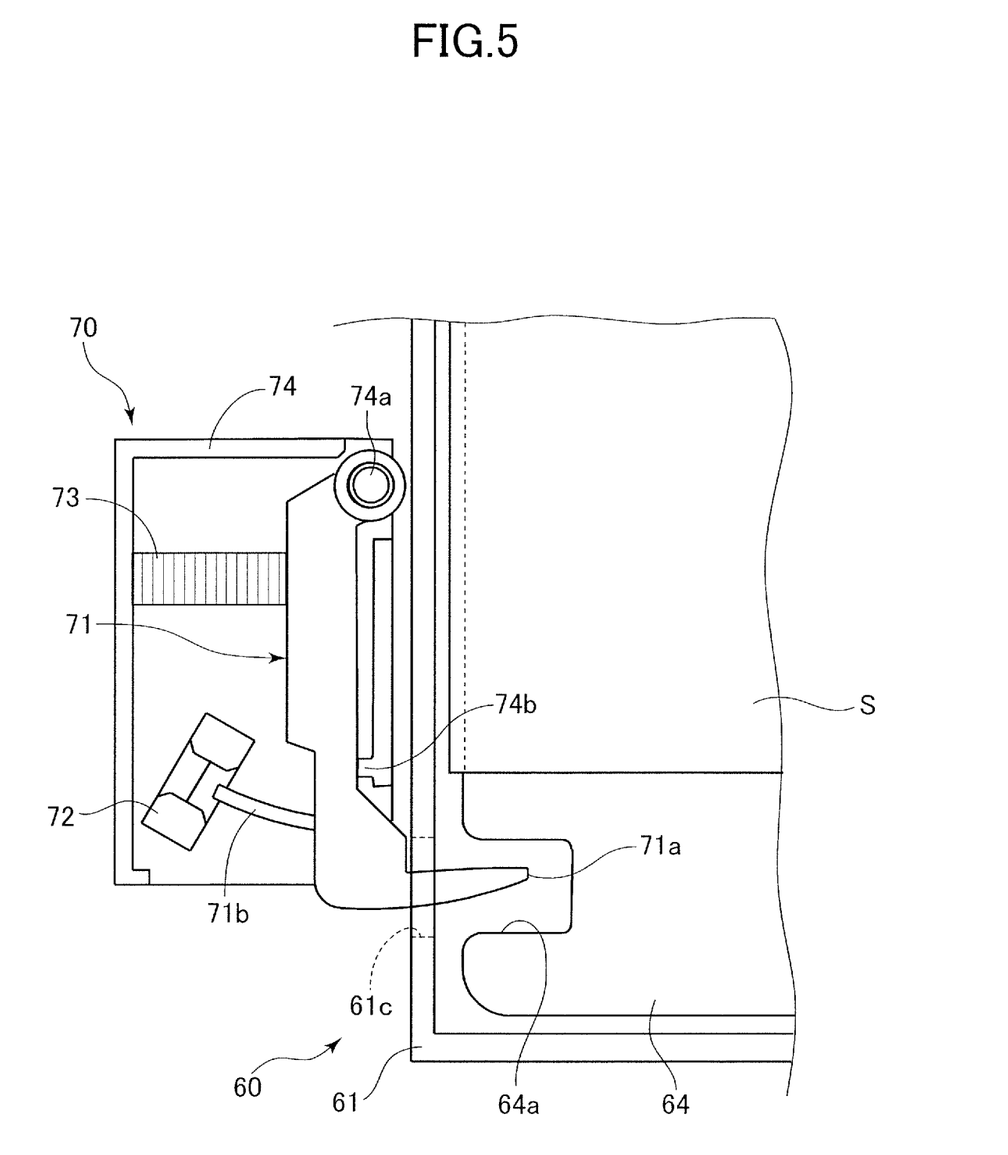
FIG. 5 is a plan view illustrating a state in which small-size sheets are stacked.

As illustrated in FIG. 2, the contact surface 71a of the lever 71 is separated by a distance W from the stack center line Lc in the width direction. Thus, the contact surface 71a is disposed on one side with respect to the stack center line Lc, in the width direction. With this arrangement, in a case where the width of the sheets S, stacked on the sheet supporting portion 64, is equal to or larger than W×2, when the cassette 61 is attached to the apparatus body 100A, the lever 71 is pressed and pivoted by the sheets S. In contrast, as illustrated in FIG. 5, in a case where the width of the sheets S, stacked on the sheet supporting portion 64, is less than W×2, even though the cassette 61 is attached to the apparatus body 100A, the lever 71 does not contact the sheets S, and does not pivot. Thus, the controller C can detect the size of the sheets depending whether the detection signal from the optical sensor 72 is ON or OFF. With the arrangement of the contact surface 71a of the lever 71 which is shifted from the stack center line Lc to a position corresponding to a target sheet size, the sheet detection unit 70 functions as a sensor which detects the size of the sheets.

Operation of the Lever

Figure 4A:
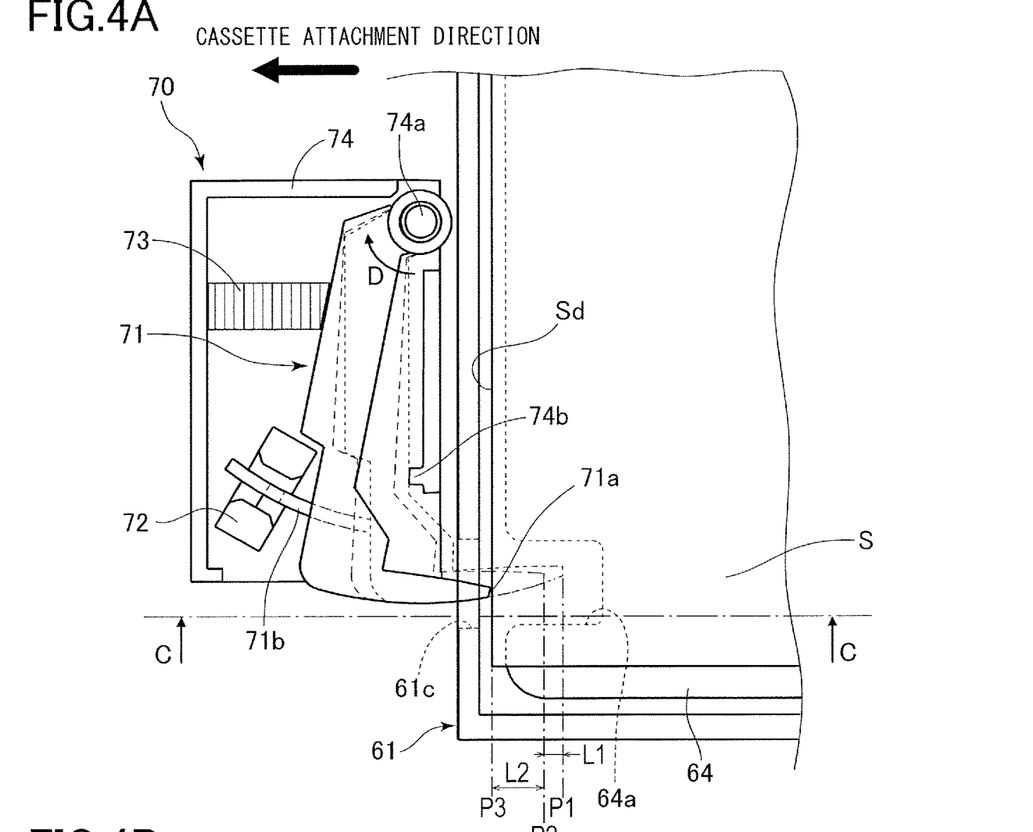
FIG. 4A is a plan view illustrating traces of movement of a lever.
Figure 4B:
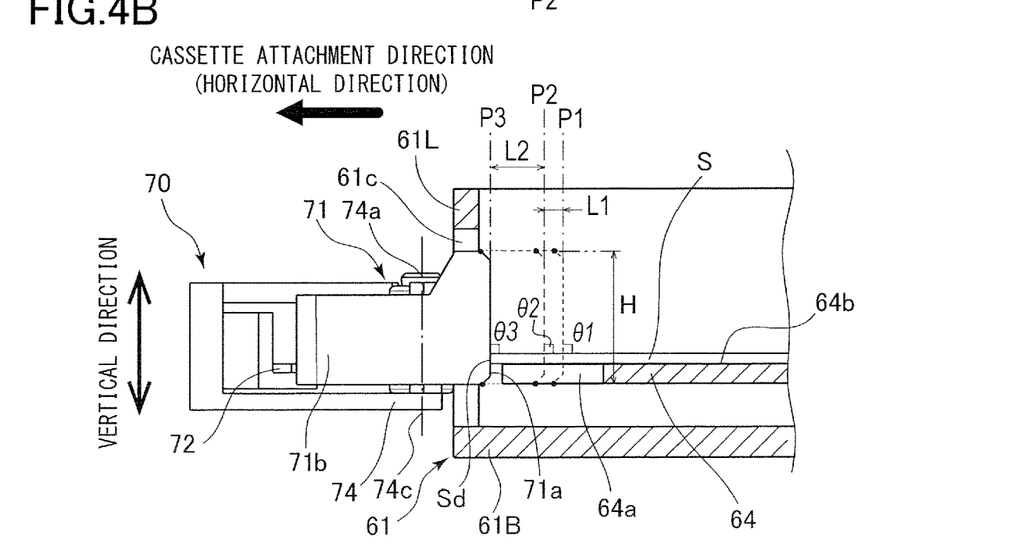
FIG. 4B is a cross-sectional view illustrating traces of movement of the lever.

Next, an operation of the lever 71 performed in the attachment of the cassette 61 will be described in detail. As illustrated in FIGS. 4A and 4B, in a state where the cassette 61 is drawn from the apparatus body 100A, the contact surface 71a of the lever 71 is positioned at a position Pb. When the cassette 61 is attached to the apparatus body 100A, the contact surface 71a positioned at the position P1 contacts the downstream edges Sd, in the cassette attachment direction, of the sheets S stacked on the sheet supporting portion 64.

When the cassette 61 is pushed from the position P1 in the cassette attachment direction by a distance L1, the lever 71 pivots toward a direction indicated by an arrow D, and the contact surface 71a of the lever 71 is positioned at a position P2. At this time, the optical path of the optical sensor 72 is blocked by the flag portion 71b of the lever 71, and the optical sensor 72 detects the sheets S stored in the cassette 61 and outputs a detection signal. When the cassette 61 is further pushed from the position P2 by a distance L2, the contact surface 71a of the lever 71 is positioned at a position P3. At this time, as illustrated in FIG. 2, the optical path of the cassette detection sensor 66 is blocked by the rib 61b, and the cassette detection sensor 66 detects the attachment of the cassette 61 and outputs a detection signal. That is, when the cassette 61 is attached to the cassette attachment portion in a state where the sheets S are stored in the cassette 61, the optical sensor 72 outputs the detection signal, and then cassette detection sensor 66 outputs the detection signal.

When the cassette detection sensor 66 detects the attachment of the cassette 61, the sheet supporting portion 64 starts rising. At this time, the optical sensor 72 has already been in a light blocked state because the optical sensor 72 entered the light blocked state when the contact surface 71a of the lever 71 was positioned at the position p2. Thus, the optical sensor 72 detects the sheets S before the sheet supporting portion 64 rises. The detection signal from the optical sensor 72 is sent to the controller C, where the size of the sheets stacked on the sheet supporting portion 64 can be determined in accordance with the detection signal. Specifically, since the contact surface 71a of the lever 71 is separated from the stack center line Lc by the distance W, the controller C can determine whether the width of the sheets S, stacked on the sheet supporting portion 64, is equal to or larger than W×2. For example, in a case where the contact surface 71a of the lever 71 is separated from the stack center line Lc by 93 mm, the controller C can identify between letter (LTR) size or A4 size sheets and B5 size sheets. Thus, the size of the sheets S is determined, and thereby a sheet feeding operation and an image forming operation are performed in accordance with the size of the sheets S. For example, the fixing apparatus 30 can use the determined size of the sheets S, and change a heating range in accordance with the width of the sheets S to appropriately heat the sheets S. In addition, the controller C can stop the sheet feeding operation when sheet size information inputted by an input unit, such as a monitor of the printer 100, or a personal computer (PC), is not the same as sheet size information determined by using the detection signal from the sheet detection unit 70. In this case, even though the controller C detects the attachment of the cassette 61 in accordance with the detection signal from the cassette detection sensor 66, the controller C does not start the motor M and keeps the sheet supporting portion 64 at the first position. The controller C may inform a user of the disagreement on sheet size, by displaying a message indicating the disagreement, on a monitor or a PC.

The position of the downstream edges Sd of the sheets S stored in the cassette 61 varies due to deformation of the sheets S or tolerance of components. In the present embodiment, however, since the distance L2 is larger than the variation, the optical sensor 72 performs no false detection.

Figure 9:
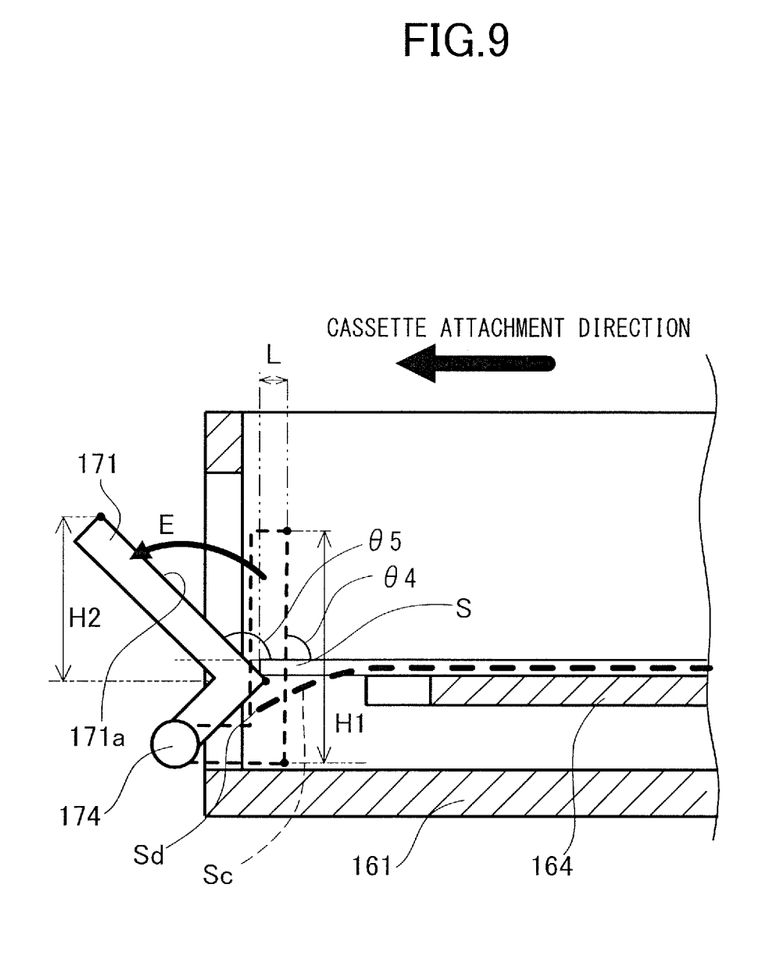
FIG. 9 is a cross-sectional view illustrating a sheet feeding apparatus of a comparative example.

Here, with reference to FIG. 9, a comparative example will be described. In the comparative example, a lever 171 can pivot around a pivot shaft 174 extending in the width direction. The lever 171 is pressed by the sheets S stored in a cassette 161, and pivoted toward a direction indicated by an arrow E. Here, an initial position of the lever 171 is indicated by a broken line, and a solid line indicates a position of the lever 171 positioned when the cassette 161 is pushed and separated from the initial position by a distance L after the lever 171 and the sheets contact each other.

In the attachment of the cassette 161, the contact angle between a contact surface 171a of the lever 171 and the sheets S changes from 04 to 05. As a result of this, force (hereinafter referred to as moving force) required to move the lever 171 toward a direction indicated by an arrow E is changed in the attachment of the cassette 161. Specifically, the amount of the moving force becomes maximum when the sheets S start to contact the lever 171, and becomes smaller as the lever 171 pivots toward the direction indicated by the arrow E. In particular, in a case where low-stiffness sheets, such as thin sheets of paper, are slightly stacked on a sheet supporting portion 164, the sheets may be bent and damaged because the stiffness of the sheets is smaller than the moving force.

In addition, when the lever 171 moves from the position indicated by the broken line to the position indicated by the solid line, the height position of the contact surface 171a of the lever 171 changes from H1 to H2. This may cause the downstream edges Sd of the sheets S to enter the space below the contact surface 171a, and may cause jam.

Here, when a user places the sheets S on the sheet supporting portion 164, the position of the leading edges of the sheets S varies due to deformation of the sheets or tolerance of components. For this reason, the distance L by which the lever 171 is pushed is required to have a certain length. In the above-described comparative example, as the distance L is increased, the amount of change of the contact angle between the contact surface 171a of the lever 171 and the sheets S also increases. To reduce the amount of change of the contact angle between the contact surface 171a and the sheets, and the amount of change of the height position of the contact surface 171a, the distance between the pivot shaft 174 of the lever 171 and a contact portion between the contact surface 171a and the sheets S may be elongated. In this case, however, the apparatus will be disadvantageously upsized.

Thus, in the present embodiment, the pivot shaft 74a of the lever 71 is formed so as to extend in the vertical direction, as illustrated in FIG. 4B. In a state where the cassette 61 is attached to the apparatus body 100A and the contact surface 71a of the lever 71 is still not positioned at the position P3, the sheet supporting portion 64 is positioned at the first position. In this time, the stacking surface 64b of the sheet supporting portion 64 extends in the horizontal direction, and the cassette attachment direction is parallel to the horizontal direction. That is, the pivot shaft 74*a* of the lever 71 extends in the direction orthogonal to the stacking surface 64*b*. Thus, when the contact surface 71*a* is pressed by the downstream edges Sd of the sheets S, the lever 71 moves toward a direction which is parallel to the stacking surface 64*b*.

Thus, in the attachment of the cassette 61 to the apparatus body 100A, when the contact surface 71*a* of the lever 71 is positioned at any of the positions P1, P2 and P3, a corresponding contact angle θ1, θ2 or θ3 between the contact surface 71*a* and the downstream edges Sd of the sheets S has a constant value of substantially 90 degrees. As a result, the force required to move the lever 71 toward the direction indicated by the arrow D, against the urging force of the pressing spring 73 is substantially constant at any of the positions P1, P2 and P3. Here, although FIG. 4B illustrates the traces of movement of the lever 71 in one cross section which is parallel with the stacking direction of the sheets S, the contact angles θ1, θ2 and θ3 have the same constant value of substantially 90 degrees in the other cross sections, which are parallel with the stacking direction.

Therefore, the pressing spring 73 with a sufficient low urging force can stably pivot the lever 71, even when low-stiffness sheets, such as thin sheets of paper each having grammage of 60 g/m² or less, are slightly stacked on the sheet supporting portion 64. In addition, since the stiffness of the sheets S can resist the urging force of the pressing spring 73 and prevent the sheets S from bending, any damage to the sheets S can be prevented.

In addition, as the distance between the pivot shaft 74*a* and the contact portion between the contact surface 71*a* and the sheets S is increased, the hole 61*c* of the cassette 61 and the recessed portion 64*a* of the sheet supporting portion 64 will decrease, and the detection accuracy of the optical sensor 72 will increase. However, the apparatus will be appropriately designed in consideration of the whole size of the apparatus.

In addition, since the lever 71 pivots in the horizontal direction on the pivot axis 74*c* of the pivot shaft 74*a* extending in the vertical direction, the height position H of the contact surface 71*a* of the lever 71 is always constant. Furthermore, the contact surface 71*a* of the lever 71 is arranged so that the contact surface 71*a* can enter the recessed portion 64*a* of the sheet supporting portion 64. That is, even when the sheet supporting portion 64 is positioned at the first position at which the sheets S are supplied, the lower edges of the contact surface 71*a* of the lever 71 is positioned lower than the sheet supporting portion 64. This can prevent the downstream edges Sd of the sheets S from entering the space below the contact surface 71*a* and causing jam. In the present embodiment, the pivot shaft 74*a* extends in the vertical direction. The present disclosure, however, is not limited to this. For example, the pivot shaft 74*a* may be inclined with respect to the vertical direction by an angle in a range of −30 to +30 degrees.

As described above, when the cassette 61 is attached to the apparatus body 100A, and the contact surface 71*a* of the lever 71 is positioned at the position P3 as illustrated in FIG. 4B, the cassette detection sensor 66 enters the light blocked state. With this operation, the sheet supporting portion 64 rises, as illustrated in FIGS. 6A and 6B. When one sheet is fed, and thus the sheets S stacked on the sheet supporting portion 64 are reduced, the sheet supporting portion 64 further rises as appropriate to maintain the contact state between the sheets S and the pickup roller 62.

FIG. 6A illustrates a state in which the sheets S are fully stacked on the sheet supporting portion 64. FIG. 6B illustrates a state in which the sheets S are slightly stacked on the sheet supporting portion 64. As illustrated in FIG. 6A, in the state where the sheets S are fully stacked, the amount of movement U1 of the sheet supporting portion 64 caused by the attachment of the cassette 61 is relatively small. Thus, the downstream edges Sd of the sheets S stacked on the sheet supporting portion 64 and the contact surface 71*a* of the lever 71 contact each other, even when the sheets are fed. In this time, the optical sensor 72 remains in the light blocked state.

As illustrated in FIG. 6B, in the state where the sheets S are slightly stacked, the amount of movement U2 of the sheet supporting portion 64 caused by the attachment of the cassette 61 is relatively large. Thus, when the sheets are fed, the contact surface 71*a* of the lever 71 does not contact the downstream edges Sd of the sheets S, and enters a space below the sheet supporting portion 64. At this time, the optical sensor 72 enters a light transmitting state. However, when the sheet detection unit 70 is used as a sensor to detect the size of the sheets, the sheet detection unit 70 detects the size of the sheets before the cassette detection sensor 66 detects the attachment of the cassette 61, that is, before the sheet supporting portion 64 rises. Thus, the size of the sheets S can be detected without being influenced by the movement of the sheet supporting portion 64.

As described above, in the present embodiment, since the lever 71 can pivot around the pivot axis 74*c* of the pivot shaft 74*a* extending in the vertical direction, the lever 71 can pivot in the horizontal direction, which is parallel to the stacking surface 64*b* of the sheet supporting portion 64. Thus, when the sheets are stacked on the stacking surface 64*b*, and then the cassette 61 is attached to the apparatus body 100A, the contact angle between the sheets and the lever 71 does not change. As a result, even when low-stiffness sheets, such as thin sheets of paper, are slightly stacked on the sheet supporting portion 64, the lever 71 can be stably pivoted, without the sheets being bent. Therefore, the sheets can be reliably detected. In addition, since the stiffness of the sheets S can resist the urging force of the pressing spring 73 and prevent the sheets S from bending, any damage to the sheets S can be prevented.

Second Embodiment

Next, a second embodiment of the present invention will be described. In the second embodiment, the sheet detection unit of the first embodiment is disposed in the vicinity of the stack center line Lc. Thus, the same components as those of the first embodiment are omitted in the drawings, or described with the same symbols given to the drawings. In addition, any effect which is not described in the following is the same as that of the first embodiment.

Figure 7:
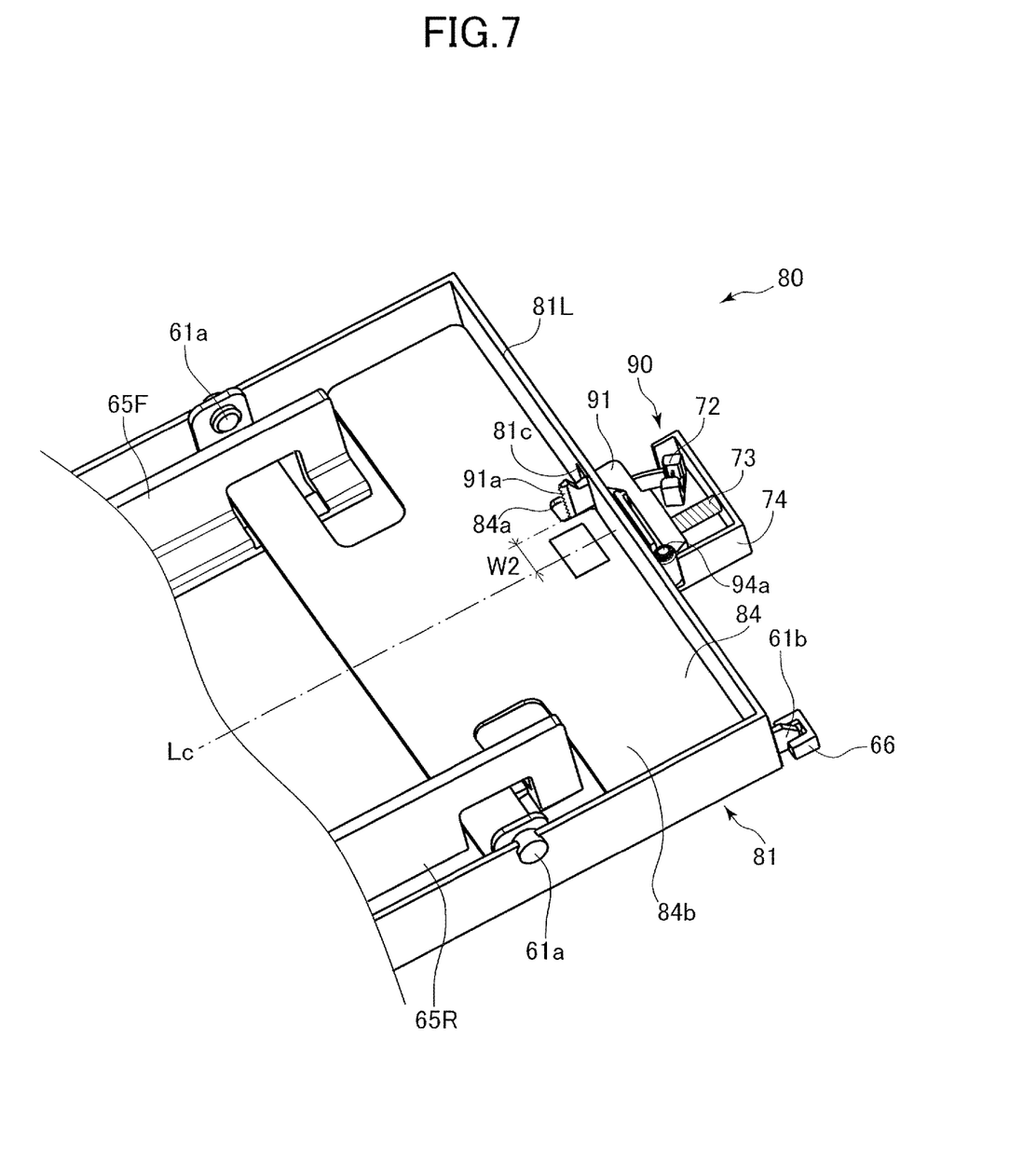
FIG. 7 is a perspective view illustrating a sheet feeding apparatus of a second embodiment.

As illustrated in FIG. 7, a sheet feeding apparatus 80 of the present embodiment includes a cassette 81, a sheet supporting portion 84 which is pivotably supported by the cassette 81, and a sheet detection unit 90. The sheet detection unit 90 includes the holder 74 which is fixed to the apparatus body 100A (see FIG. 1), a lever 91, the optical sensor 72, and the pressing spring 73. The lever 91 is supported by the holder 74 so that the lever 91 can pivot around a pivot shaft 94*a* extending in the vertical direction. In addition, the lever 91 is urged by the pressing spring 73 toward the cassette 81.

A side plate 81L of the cassette 81 is provided with a hole 81*c* at a position corresponding to a contact surface 91*a* of the lever 91, which is formed at the leading end of the lever 91. Thus, when the cassette 81 is attached to the apparatus body 100A, the lever 91 can pass through the hole 81c. In addition, the sheet supporting portion 84 is provided with a recessed portion 84a at a position corresponding to the contact surface 91a of the lever 91. When the cassette 81 is attached to the apparatus body 100A, the lever 91 enters the hole 81c and the recessed portion 84a, and the contact surface 91a of the lever 91 contacts the edges of the sheets stacked on the sheet supporting portion 84.

The contact surface 91a of the lever 91 is separated from the stack center line Lc by a distance W2 in the width direction. The distance W2 is smaller than half the width of the smallest sheets which can be stacked on the sheet supporting portion 84. That is, the contact surface 91a of the lever 91 is arranged at a position at which the contact surface 91a can contact any size of the sheets stacked on the sheet supporting portion 84.

The pivot shaft 94a of the lever 91 extends in the vertical direction, as in the first embodiment. The present disclosure, however, is not limited to this. For example, the pivot shaft 94a may be inclined with respect to the vertical direction by an angle in a range of −30 to +30 degrees. When the cassette 81 is attached to the apparatus body 100A in a state where the sheets are stacked on the sheet supporting portion 84, the downstream edges of the sheets S contacts the contact surface 91a of the lever 91, and the lever 91 is pushed by the sheets S. As a result, the lever 91 pivots in the horizontal direction on the pivot shaft 94a. With this operation, the optical sensor 72 enters the light blocked state, and thus the sheets stored in the cassette 81 can be detected.

Figure 8:
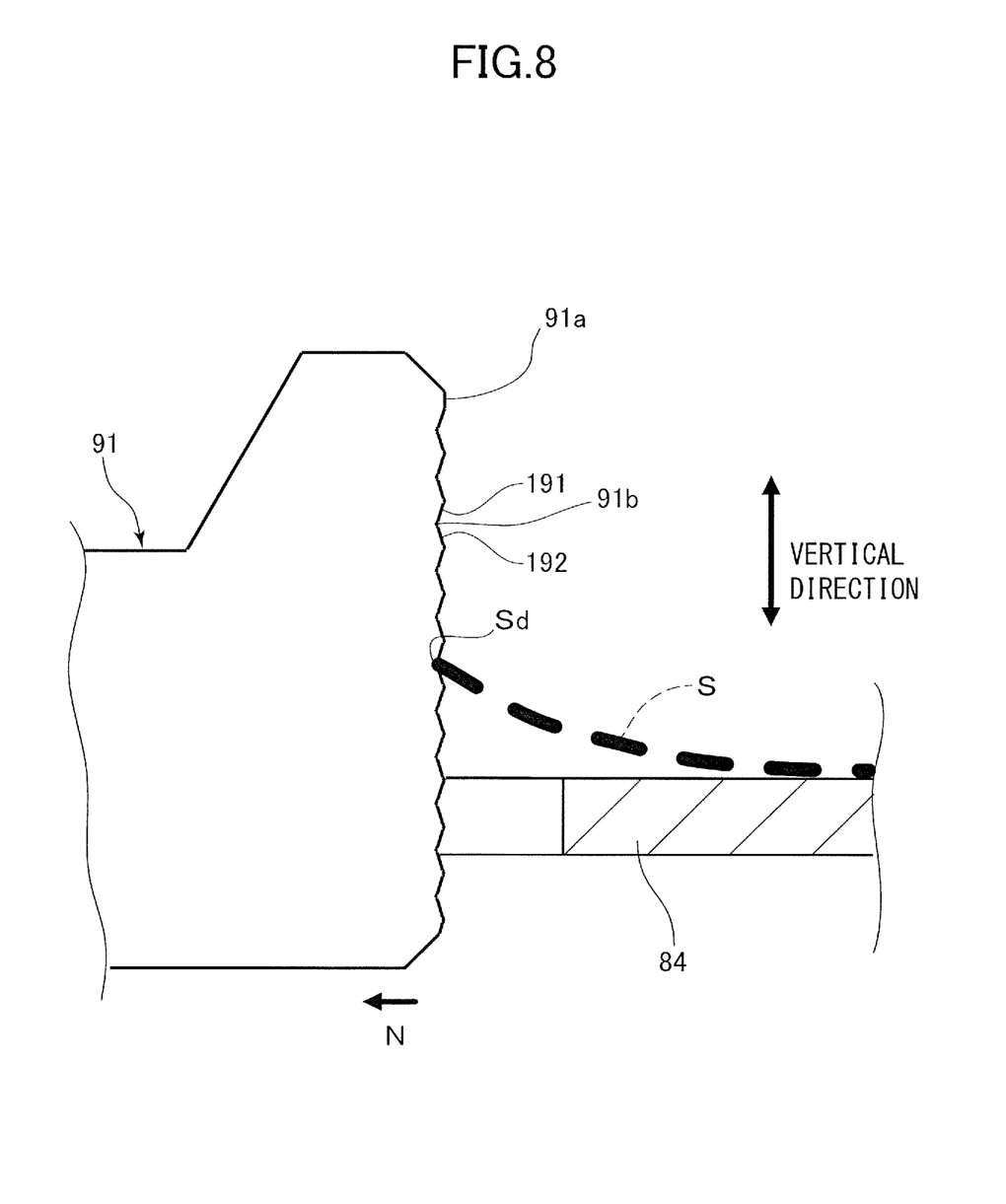
FIG. 8 is an enlarged cross-sectional view illustrating a contact surface.

As illustrated in FIG. 8, the contact surface 91a, which can contact the downstream edges of the sheets, has continuous convexities and concavities in the vertical direction. The convexities and concavities include a concave portion 91b, which is formed by inclined adjacent surfaces 191 and 192. The inclined surfaces 191 and 192, and the concave portion 91b are one example of a portion of the continuous convexities and concavities. With this shape, even when the downstream edges of the sheet, stacked on the sheet supporting portion 84, is curled for example, the downstream edges of the sheets S is prevented from moving, by the concave portion 91b. Thus, the downstream edges of the sheets S can be prevented from sliding on the contact surface 91a and falling off the cassette 81. In addition, since the inclined surfaces 191 and 192 are inclined toward a direction perpendicular to the moving direction N of the lever 91, the inclined surfaces 191 and 192 allow the sheets S to rise. That is, when the sheet supporting portion 84 rises in a state where the downstream edges of the sheets S is in contact with the concave portion 91b, the inclined surface 191 is pressed by the sheets S, and the lever 91 is retracted toward the moving direction N. Thus, the sheet supporting portion 84 and the sheets S are not prevented from rising.

The present embodiment can determine whether the sheets S are stacked on the stacking surface 84b of the sheet supporting portion 84 when the cassette 81 is attached to the apparatus body 100A. When the cassette 81 which stores the sheets is attached to the apparatus body 100A, the cassette detection sensor 66 and the optical sensor 72 of the sheet detection unit 90 each output a detection signal. Then the controller C controls the motor M in accordance with the detection signal from the cassette detection sensor 66, and raises the sheet supporting portion 84. With this operation, the sheet supporting portion 84 rises to the second position, and thus the pickup roller 62 can feed the sheets. When the cassette 81 which stores no sheets S is attached to the apparatus body 100A, the cassette detection sensor 66 outputs a detection signal, but the optical sensor 72 outputs no detection signal. Thus, the controller C can determine that the cassette 81 stores no sheets. That is, when the controller C receives a detection signal from the cassette detection sensor 66, but receives no detection signal from the optical sensor 72, the controller C does not control the motor M, and causes a monitor or a PC to display a message indicating that the cassette 81 stores no sheets, for informing a user of the message. In this manner, the controller C determine determines a presence of a sheet stacked on the stacking surface 84b in accordance with detection signals from the cassette detection sensor 66 and the optical sensor 72.

The convexities and concavities of the contact surface 91a of the lever 91 of the second embodiment can be applied to the contact surface 71a of the lever 71 of the first embodiment.

In the above-described embodiments, the lever can pivot in the horizontal direction. The present disclosure, however, is not limited to this. For example, the lever may be slid in the horizontal direction.

When the stacking surface of the sheet supporting portion positioned at the first position extends in the horizontal direction, the lever is preferably moved in the horizontal direction. However, when the stacking surface does not extend in the horizontal direction, the lever can be moved in a direction which is parallel to a direction in which the stacking surface extends.

The present invention is not limited to the sheet feeding apparatus that can be detachably attached to the apparatus body. For example, the present invention can also be applied to a manual feeding apparatus in which sheets are stacked on a manual feed tray, or an automatic document feeder (ADF) which feeds documents on which images to be read are printed. If the stacking surface of the manual feed tray or the document tray does not extend in the horizontal direction, the lever can be moved not in the horizontal direction, but in a direction which is parallel with a direction in which the stacking surface extends.

In addition, in the above-described embodiments, the cassette is detachably attached to the apparatus body. However, sheets may be stacked on a feed tray fixed to the apparatus body. The present invention is not limited to the configuration in which sheets are stacked on the sheet supporting portion, which can move up and down. The sheets may be stacked on the base plate 61B (see FIG. 2) of the cassette, and the pickup roller may move up and down with respect to the sheets. In this case, the base plate 61B serves as a stacking surface on which sheets are stacked.

Also, although the description is made using the electrophotographic printer 100 in any of the embodiments describe above, the present invention is not limited to this. For example, the present invention may also be applied to an ink-jet image forming apparatus that forms images on sheets by injecting ink from its nozzle.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-093500, filed May 10, 2017, which is hereby incorporated by reference wherein in its entirety.

What is claimed is:

1. A sheet feeding apparatus comprising:
a stacking portion comprising a stacking surface on which sheets are stacked, the stacking portion configured to be attached to and drawn from an apparatus body;
a feeding portion configured to feed the sheets, which are stacked on the stacking surface, in a sheet feeding direction;
an abutment member comprising a contact surface configured to contact downstream edges, in the sheet feeding direction, of the sheets on the stacking surface and extending along a stacking direction of the sheets, the abutment member being configured to pivot around a pivot axis with a constant contact angle between the contact surface and the downstream edges of the sheets in a cross section parallel with the stacking direction in a case where the contact surface is pushed by the downstream edges of the sheets stacked on the stacking surface while the stacking portion is being attached to the apparatus body in the sheet feeding direction; and
a detection portion configured to output a detection signal in accordance with a position of the abutment member,
wherein the stacking portion comprises a moving portion supported movably upward from a first position to a second position, the moving portion including the stacking surface, and
wherein the pivot axis extends along the stacking direction and extends in a direction orthogonal to the stacking surface of the moving portion positioned at the first position.

2. The sheet feeding apparatus according to claim 1, wherein the abutment member is configured to pivot in a horizontal direction around the pivot axis extending in a vertical direction.

3. The sheet feeding apparatus according to claim 1, wherein the moving portion defines a recessed portion which the abutment member is able to enter.

4. The sheet feeding apparatus according to claim 1, wherein the stacking portion comprises a supporting portion configured to movably support the moving portion between the first position and the second position, and
wherein the supporting portion defines a hole through which the abutment member is able to pass in a case where the supporting portion is attached to the apparatus body.

5. The sheet feeding apparatus according to claim 1, wherein the abutment member and the detection portion are provided on the apparatus body.

6. The sheet feeding apparatus according to claim 1, further comprising a controller configured to detect the sheets stacked on the stacking surface in accordance with a detection signal from the detection portion.

7. The sheet feeding apparatus according to claim 6, wherein the detection portion is separated from a sheet stack center line by a predetermined distance in a width direction orthogonal to the sheet feeding direction, and
wherein the controller is configured to determine a size of the sheets stacked on the stacking surface in accordance with a detection signal from the detection portion.

8. The sheet feeding apparatus according to claim 7, further comprising an attachment detection portion configured to output a detection signal in a case where the stacking portion is attached to the apparatus body,
wherein the detection portion and the attachment detection portion are arranged such that the detection portion outputs a detection signal earlier than the attachment detection portion outputs a detection signal.

9. The sheet feeding apparatus according to claim 6, wherein the controller is configured to determine a presence of a sheet stacked on the stacking surface in accordance with a detection signal from the detection portion.

10. The sheet feeding apparatus according to claim 6, further comprising an attachment detection portion configured to output a detection signal in a case where the stacking portion is attached to the apparatus body,
wherein the controller is configured to determine a presence of a sheet stacked on the stacking surface in accordance with detection signals from the attachment detection portion and the detection portion.

11. The sheet feeding apparatus according to claim 10, wherein the detection portion and the attachment detection portion are arranged such that the detection portion outputs a detection signal earlier than the attachment detection portion outputs a detection signal.

12. An image forming apparatus comprising:
the sheet feeding apparatus according to claim 1; and
an image forming portion configured to form an image on a sheet fed by the sheet feeding apparatus.

13. The sheet feeding apparatus according to claim 1, wherein the stacking portion comprises a regulating portion configured to regulate positions of ends, in a width direction orthogonal to the sheet feeding direction, of the sheets.

14. A sheet feeding apparatus comprising:
a stacking portion comprising a stacking surface on which sheets are stacked;
a feeding portion configured to feed the sheets, which are positioned at a set position and which are stacked on the stacking surface, in a sheet feeding direction;
an abutment member comprising a contact surface configured to contact downstream edges, in the sheet feeding direction, of the sheets at the set position and extending along a stacking direction of the sheets, the abutment member being configured to move with a constant contact angle between the contact surface and the downstream edges of the sheets in a cross section parallel with the stacking direction in a case where the contact surface is pushed by the downstream edges of the sheets which are being inserted toward the set position in the sheet feeding direction; and a detection portion configured to output a detection signal in accordance with a position of the abutment member, wherein the contact surface has convexities and concavities.

15. An image forming apparatus comprising:

the sheet feeding apparatus according to claim 14; and an image forming portion configured to form an image on a sheet fed by the sheet feeding apparatus.

* * * * *